UNITED STATES PATENT OFFICE.

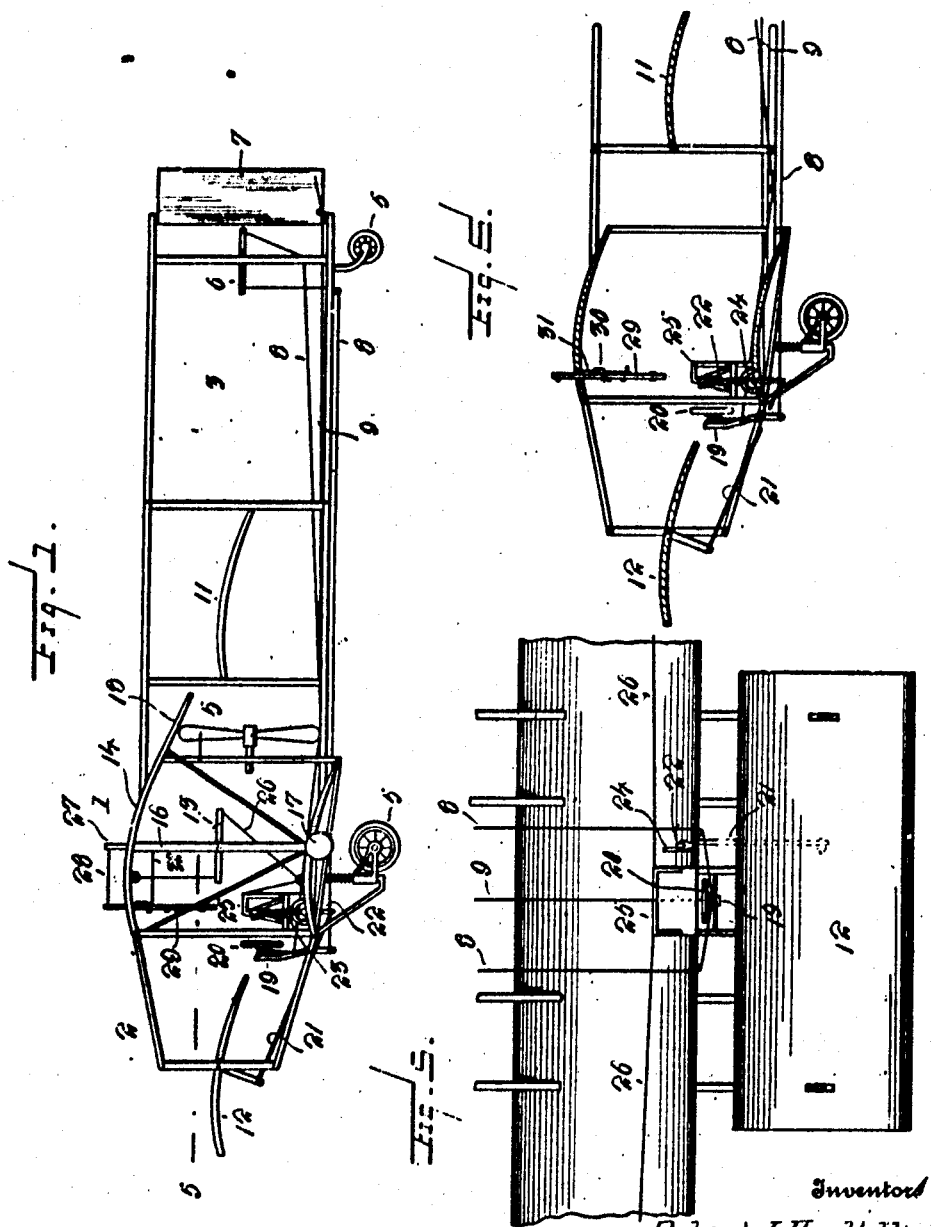

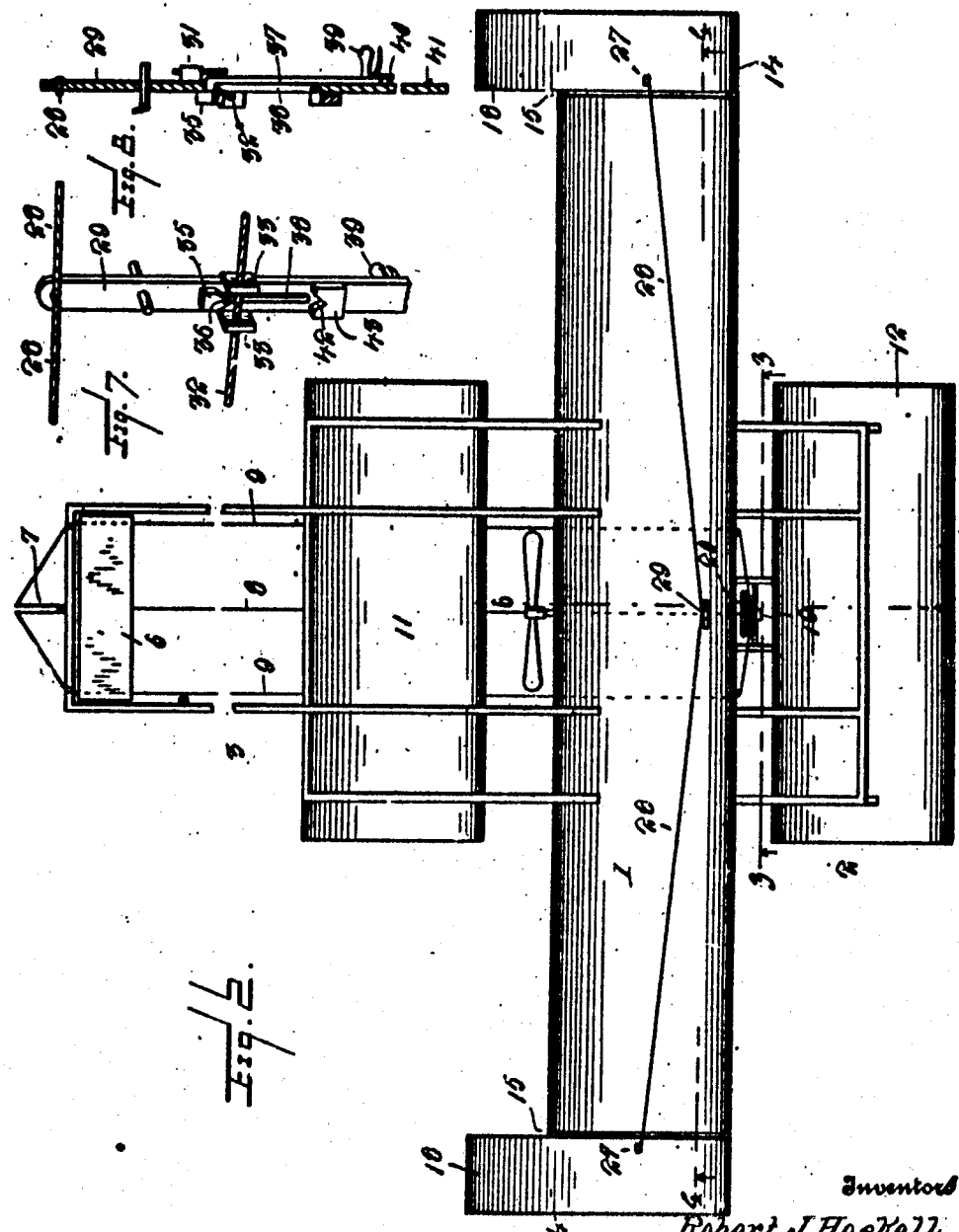

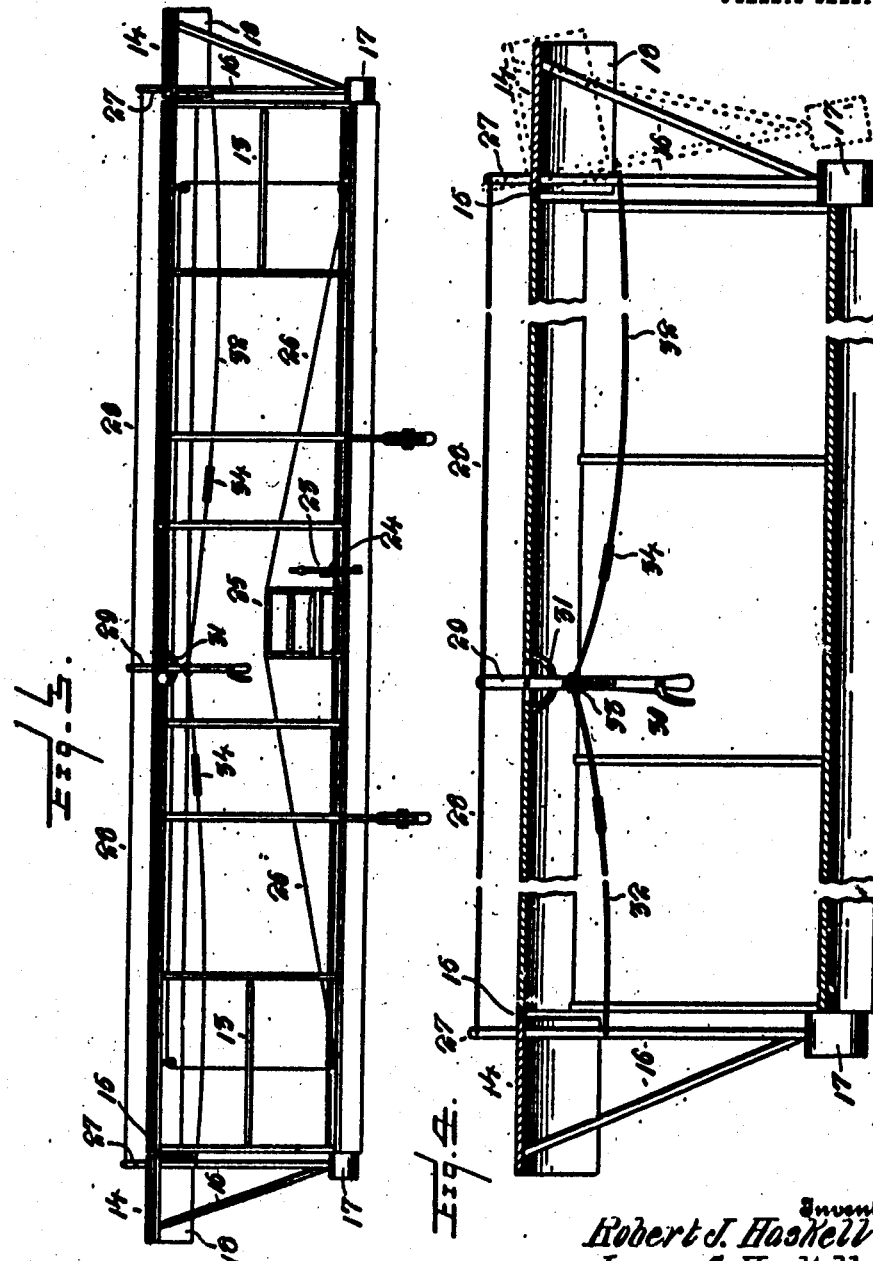

ROBERT J. HASKELL, OF LOUISVILLE, KENTUCKY, AND JAMES G. HASKELL, OF WASHINGTON, DISTRICT OF COLUMBIA.

FLYING-MACHINE.

1,011,124.     Specification of Letters Patent.     Patented Dec. 5, 1911.

Application filed June 10, 1911. Serial No. 632,387.

*To all whom it may concern:*

Be it known that we, ROBERT J. HASKELL and JAMES G. HASKELL, citizens of the United States of America, residing, respectively, at Louisville, in the county of Jefferson and State of Kentucky, and at Washington, District of Columbia, have invented new and useful Improvements in Flying-Machines, of which the following is a specification.

This invention relates to flying machines of the aerodynamical type, the object of the invention being to provide a machine which has a high degree of inherent longitudinal stability and embodies simple and effective means for automatically maintaining the lateral stability thereof.

A further object of the invention is to provide a novel construction and arrangement of fore and aft stability planes which have a normal fixed position and the front one of which is manually adjustable to secure safety under exigencies of service where loss of the longitudinal balance is threatened.

A still further object of the invention is to provide balancing devices at the sides of the machine which operate automatically when the machine tilts laterally to restore the lateral balance, and which are also manually adjustable in case of emergency and to enable the machine to be properly banked in making a turn.

The invention consists of the features of construction, combination and arrangement of parts hereinafter fully described and claimed, reference being had to the accompanying drawings, in which:—

Figure 1 is a side elevation of a flying machine constructed in accordance with our invention. Fig. 2 is a top plan view of the same. Fig. 3 is a sectional front elevation on the plane indicated by the line 3—3 of Fig. 2. Fig. 4 is a vertical transverse section on line 4—4 of Fig. 2. Fig. 5 is a horizontal section on line 5—5 of Fig. 1. Fig. 6 is a vertical longitudinal section on line 6—6 of Fig. 2. Fig. 7 is a perspective view of the controlling lever and connections. Fig. 8 is a vertical fore and aft section of the same.

The frame structure of the machine as a whole comprises a main frame 1, a short or stub head frame 2, and a tail frame 3 of some considerable length to give an efficient degree of inherent stability in a longitudinal direction. The main frame carries one or more, preferably two, superposed, main planes or supporting surfaces, which may be of any conventional curvature, and also of any desired length and width to secure the lifting power required. The machine is supported when at rest upon suitably cushioned wheels 5, constituting the launching and alighting gear of the machine, which, however, may be of any desired type and construction. It is to be understood, of course, that the parts of the frame work are braced and trussed in any ordinary or preferred way to secure stanchness and rigidity.

Mounted upon the tail frame are horizontal and vertical rudders 6 and 7, from which pairs of cables 8 and 9 lead to controlling devices arranged upon the main frame adjacent to the aviator's seat 10, as hereinafter described. Also mounted upon the tail frame is a stability plane 11 of less length than the main plane, but having the same general width and curvature. This stability plane 11 is disposed between the main frame and the transverse center of the tail frame and acts as an auxiliary supporting surface to sustain the weight of the tail frame and provide for a proper distribution of the centers of air pressure relative to the center of gravity of the machine to secure greater inherent longitudinal stability. A similar stability plane 12 is mounted upon the head frame and normally remains fixed in position at the same angle of incidence as the plane 11, to secure an effective degree of automatic balancing motion of the machine on its transverse axis. The plane 12 may, however, be adjusted to vary its angle of incidence as occasion may require when it is desired or necessary to secure a rapid longitudinal tilting of the machine for balancing or steering, as when a loss of longitudinal stability is threatened and it is necessary to take instant measures to prevent danger. Said plane 12 may also be employed as a horizontal rudder for vertical steering with the rear horizontal rudder or, in an emergency, in lieu of said rudder to maintain control of the machine in the event of the derangement of the rear horizontal rudder from any cause.

The machine is provided with ailerons 13 or equivalent devices under manual control for maintaining the lateral balance under ordinary conditions and for banking the machine in making turns. Also provided upon the ends of the upper main plane are balancing planes or wing tips 14, each hinged to the main plane to swing vertically, as indicated at 15, and each provided with a depending bracket or frame 16 carrying at its lower end an automatic controlling element, such as a weight 17. The said balancing planes or wing tips normally lie in the plane of the main frame and are preferably curved to conform thereto, but are of greater length than the width of the main plane to provide rearwardly projecting extensions 18, which increase their dimensions in the direction of length of the machine to adapt them to have an effective degree of lifting power. Normally the weights contact with the ends of the main frame and, together with the bracket 16, operate as pendulum levers to mantain the balancing planes in normal position as long as the machine preserves its lateral balance. When, however, either side of the machine tilts downward, the pendulum weight controlling the balancing plane at such side maintains the normal position of said balancing plane, so that a relative motion between the balancing plane and body of the machine is established to increase the angle of incidence of the balancing plane, whereby a lifting pressure of the air thereon is secured to restore the machine to its normally balanced position, as will be readily understood.

Controlling devices are provided for adjusting the horizontal and vertical rudders, the front stability plane, the ailerons and the balancing planes or wing tips, so that said balancing planes or wing tips may be manually controlled in addition to the rudders and front stability plane, in order that the degree of inclination of the machine may be controlled in banking the same, and also in order that the balancing planes may be employed in conjunction with the ailerons for a rapid and effective lateral balancing control in case of an emergency. As shown, a lever 19 is pivotally mounted for fore and aft swinging movements, and to this lever, above and below the pivot point thereof, are attached the forward ends of the cables 8, so that by reverse movements of the lever the horizontal rudder may be adjusted in opposite directions. Journaled on the lever is a grooved pulley or hand wheel 20, to which are attached the forward ends of the cables 9, which are adapted to wind in opposite directions thereon, so that upon turning said hand wheel in one direction or the other opposite swinging movements may be imparted to the vertical rudder. The plane 12 is connected by a rod or link 21 with the lever 22, by which it may be adjusted, said lever carrying a spring actuated pawl 23 to engage a rack 24, whereby it may be fixed in adjusted position. A rocking or swinging shoulder fork 25 of ordinary type is provided for controlling the ailerons and is coupled to cables 26 leading therefrom, the ailerons being connected for movement in opposite directions in unison, in the usual manner. Each balancing plane 18 is provided with an upwardly projecting crank arm 27 and from the crank arms of said planes lead cables 28 to the upper end of a lever 29 carrying a spring actuated pawl 30 to engage a rack 31, so that the lever may be normally locked in a neutral position, allowing the planes to have free and independent automatic balancing movements. Through the controlling means described either plane 28 may be adjusted upwardly independently of the other, thus enabling the balancing plane at either side of the machine to be elevated at the same time the adjacent aileron is adjusted for a lifting movement, in order that a rapid elevation of the desired side of the machine may be secured in turning and banking movements. This construction also permits of the manual control of the balancing planes for maintaining the lateral balance of the machine in the event of derangement of the ailerons or binding of the operating cables thereof, thus securing increased safety in the operation of the machine.

To the bracket 16 are connected cables 32, which are joined at their inner ends and pass through a pair of spaced guides 33 formed or provided upon the lever 29 below the pivot point thereof. Each of these cables consists of sections connected by an elastic element 34, in the form of a spring or other suitable expansible and contractible coupling. Normally the cables 32 hang sufficiently slack to permit the balancing planes 14 to swing freely for an automatic balancing action, but a means is provided whereby the slack in said cables may be taken up in order that the degree of swinging movement of the ailerons may be regulated and controlled. This slack take-up device comprises a jaw 35 having a tapered end 36 and mounted upon the angularly bent upper end of a bar 37, which angularly bent end of the bar slides vertically in a guide slot 38. The lower end of the bar carries an operating handle 39 and is provided with a latch 40 to engage a keeper 41, whereby the bar may be locked at the limit of its downward movement, in which the tapered end 36 of the jaw 35 engages a V-shaped recess 42 in a fixed clamping jaw 43. The jaw 35 normally overlies that portion of the cables disposed between the guides 33, so that upon moving the lever downwardly said movable jaw will engage such portion of the cables and carry the same down in the form of a loop into engagement with the fixed jaw, in which position the lever may be held by engaging the latch 40 with the keeper 41 to maintain the cables in the taut condition to which they are drawn by the formation of the loop. In this action the extensible couplings 34 are somewhat expanded, so that upon the return of the lever to its normal position the couplings will react and again restore the slack in the cables.

It will be understood that under all normal conditions the lever 29 is unlocked for free movement and the cables 32 hang slack to permit the balancing planes 14 to have freedom of operation for automatically maintaining the lateral balance under ordinary service conditions. By this means the necessity of employing the ailerons is obviated, except in the operations of turning and banking, or when a strong breeze is blowing or it is desired to secure a rapid return of the unbalanced machine to a balanced position. It is desirable under some conditions to limit the swinging movements of the planes 14, which may be accomplished by locking the lever 29 in a neutral position and adjusting the slack take-up device for use, in which event the movements of the planes 14 will be limited to the extent of movement of the cables 32 permitted by the expansion of the couplings 34. Upon drawing the cables 32 taut and unlocking the lever 29, the latter may be adjusted to draw upon one or the other of the cables 32 to regulate the resistance of said cable to the upward movement of the plane 14 connected therewith. By this means the plane 14 at the low, short-turning side of the machine may be controlled to diminish its lifting action so that the machine may be accurately and sensitively banked.

Having thus described our invention, what we claim as new is:

1. A flying machine embodying a pair of superposed supporting surfaces, vertically movable balancing planes hinged to the lateral margins of the upper supporting surface, brackets connected with and depending from said planes, and weights at the lower ends of said brackets adapted to abut against the lateral margins of the lower supporting surface, to maintain the planes in normal position, said brackets and weights operating as pendulums independently controlling the operation of the balancing planes when the machine tilts laterally in one direction or the other.

2. A flying machine embodying a pair of superposed supporting surfaces, vertically movable balancing planes hinged to the lateral margins of the upper supporting surface and having extensions projecting in rear of said supporting surface, brackets depending from said planes, and weights carried by the brackets and normally bearing against the lateral margins of the lower supporting surface to maintain the planes in normal position, said brackets and weights operating as pendulums controlling the action of the planes when the machine tilts laterally in either direction.

3. A flying machine embodying a pair of superposed supporting surfaces, vertically movable balancing planes hinged at their inner edges to the lateral margins of the upper supporting surface, substantially triangular brackets depending from said planes, and weights attached to the brackets at a point substantially in line with the hinged edges of the planes and adapted to abut against the lateral margins of the lower supporting surface to maintain said planes in normal position, said brackets and weights operating as pendulums independently controlling the action of the planes when the machine tilts laterally in either direction.

4. In a flying machine, a supporting surface, balancing planes at the lateral margins thereof pivoted to tilt vertically, weights attached to and independently controlling the respective planes, an operating device, and connections between said operating device and the respective planes, whereby either plane may be manually tilted independently of the other.

5. In a flying machine, a supporting surface, lateral balancing planes at the margins of said surface, weights attached to and controlling each plane for an automatic tilting operation independently of the other, a pivoted lever, connections between the arms of the lever and the balancing planes, whereby either plane may be manually tilted independently of the other, normally slack connections between the other arm of the lever and the balancing planes, and means for taking up the slack in said connections.

6. In a flying machine, the combination of a main frame carrying a supporting surface, a short head frame, a relatively longer tail frame, horizontal and vertical rudders carried by the tail frame, a fixed stabilizing plane upon the tail frame between the transverse center of said frame and the main frame, a corresponding stabilizing plane adjustably mounted on the head frame and normally maintained at a corresponding angle to said fixed stabilizing plane, balancing devices at or near the lateral margins of the supporting surface, and means for adjusting the rudders, front stabilizing plane, and balancing planes.

7. In a flying machine, a supporting surface, balancing planes, weights for normally holding the balancing planes in a determined position, a controlling device, connections between the controlling device and balancing planes for manually tilting the latter, normally slack controlling connections between said controlling device and the balancing planes, and means for taking up the slack in said connections.

8. In a flying machine, a supporting surface, balancing planes, weights for normally holding said planes in a determined position, a controlling device, connections between the controlling device and balancing planes for manually tilting the latter, normally slack controlling connections between said controlling device and the balancing planes, means carried by said controlling device for taking up the slack in said connections, and an extensible and contractible element in each of said connections.

9. In a flying machine, a supporting surface, lateral balancing planes, a gravity controlled means for normally maintaining each plane in a determined position and permitting independent relative movement thereof when the adjacent side of the machine tilts downward, a controlling device, normally slack connections between said controlling device and the planes, and means for taking up the slack in said connections.

10. In a flying machine, a supporting surface, lateral balancing planes, a gravity controlled means connected with each plane for normally maintaining the same in a determined position and permitting relative movement of said plane when the adjacent side of the machine tilts downward, a controlling device, normally slack connections between the controlling device and planes, and an extensible and contractible element in each of said connections.

11. In a flying machine, a supporting surface, gravity controlled balancing planes, each movable independently of the other when the adjacent side of the machine tilts downward, a controlling lever, connections between the planes and one arm of the lever, whereby each plane is permitted to have independent automatic tilting movement and may be manually tilted independently of the other planes, and means also controlled by the lever and connected with the other arm thereof for limiting the tilting motion of the plane.

12. In a flying machine, a supporting surface, balancing planes, gravity operated devices for controlling each plane independently of the other, and means for simultaneously establishing a resistance to the tilting motion of the planes for limiting such motion.

13. In a flying machine, a supporting surface, lateral balancing planes, a gravity operated means independently controlling each plane, a lever, normally slack flexible connections between the planes and lever, sliding clamping means on the lever for taking up the slack in said connections, and a contractible and expansible element in each connection.

14. In a flying machine, the combination of a main frame carrying a supporting surface, relatively short and long head and tail frames, horizontal and vertical rudders carried by the tail frame, a fixed stabilizing plane upon the tail frame between the transverse center of said frame and the main frame, a corresponding stabilizing plane adjustably mounted on the head frame and normally maintained at a corresponding angle to said supporting surface and fixed stabilizing planes, balancing devices at or near the lateral margins of the supporting surface, means for adjusting the rudders and balancing planes, and means for adjusting the front stabilizing plane independently of said rudders and balancing planes.

In testimony whereof we affix our signatures in presence of two witnesses.

ROBERT J. HASKELL.
JAMES G. HASKELL.

Witnesses to signature of Robert J. Haskell:
BENJ. F. GARDNER,
EVA COOPER.

Witnesses to signature of James G. Haskell:
C. C. HINES,
BENNETT S. JONES.